Nov. 29, 1927.
L. LAMBERT
1,651,211
AUTOMOBILE TIRE
Filed April 9, 1927
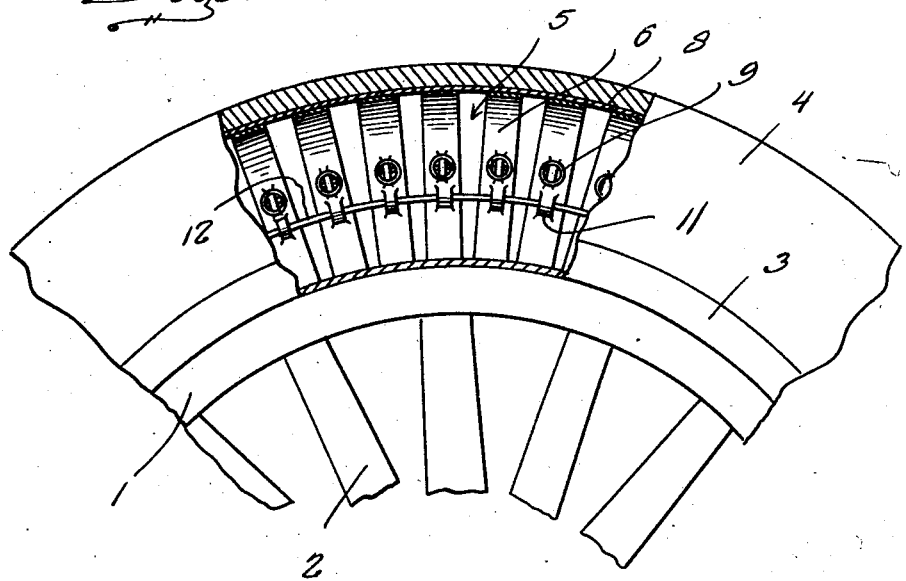
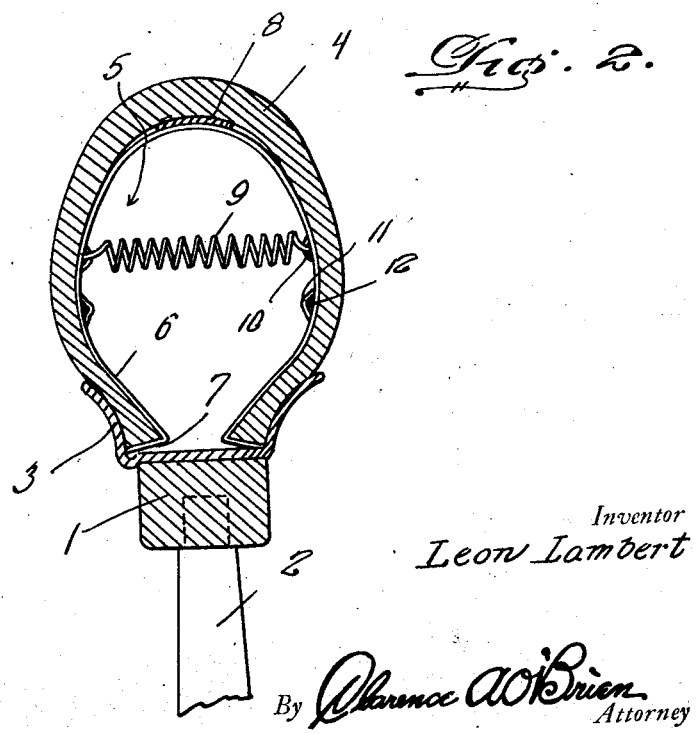
Inventor
Leon Lambert
By Clarence A. O'Brien
Attorney Patented Nov. 29, 1927.

1,651,211

UNITED STATES PATENT OFFICE.

LEON LAMBERT, OF BIDDEFORD, MAINE.

AUTOMOBILE TIRE.

Application filed April 9, 1927. Serial No. 182,416.

The present invention relates to an improved automobile tire of the type wherein the customary pneumatic inner tube is dispensed with and a spring core is substituted therefor.

I am aware, of course that tubeless tires are not broadly new, and that various types of resilient cores have been employed with a view toward providing a substantially puncture proof tire, possessing practically all of the advantages of the ordinary pneumatic tire, and advantageous for the reason that the life of the tire is increased and the expense of upkeep reduced.

My principal aim is to generally improve upon spring tires of this class by providing one which includes a casing containing an especially constructed resilient core composed of exclusive and distinctive details, cooperating in a way to form an efficient and practical construction.

The particular physical features of construction will become more readily apparent from the following description and drawing.

In the accompanying drawing:

Figure 1 is a fragmentary side view with a portion broken away and shown in section to disclose the internal construction more plainly.

Figure 2 is an enlarged fragmentary transverse section through the tire, rim and wheel.

In the drawings, the reference character 1 designates the wheel rim to which the ordinary spokes 2 are connected. The metallic rim 3 is of the approximate configuration shown, in order to accommodate the fabricated casing 4. This casing is of the straight side type.

Located in the casing is the special resilient core or filler, which is generally designated by the reference character 5. It is composed of a multiplicity of leaf springs 6, and each spring is somewhat ovate in configuration and has its ends separated and terminating in outwardly directed extremities 7 engaging the bead portions of the casing as shown better in Figure 2. The normal form of the spring is represented in Figure 2, the expansion being such as to cause the casing to assume a somewhat ovate shape.

The springs are arranged in circumferentially spaced relation as indicated in Figure 1 and they are preferably located rather close to each other. The crown portion of the spring contacts a narrow lining strip 8. In practice, this strip will be composed of appropriate fabric, reinforced in a suitable manner. Obviously, it is the purpose of the strip to prevent undue wear of the casing, due to the rubbing action of the crown portions of the springs. The springs are free of connection with the strip however. Connected with each leaf spring is a coiled spring 9 of the expansion type. The purpose of this spring is to resist expansion and thereby oppose spreading of the leaf spring 6. Also, when the casing is under stress, the coil springs resist the spreading or expansive action of the leaf springs to prevent undue flattening of the tire casing. It will be noted that eyes 10 are struck out from the intermediate portions of the arms of the leaf springs and the ends of the coiled springs connected with these eyes. Just inward of the eyes 10 additional eyes or straps are struck out, these being indicated by the reference characters 11. Connecting rods or wires 12 extend through the eyes 11, and maintain the spring units (each composed of a leaf spring and a supplemental coil spring) in assembled relation.

From the foregoing description and drawings it will be observed that the particular feature of construction is the novel spring core, which is composed of a multiplicity of leaf springs arranged in close spaced relation and tied together, by assembling wire rods, said springs carrying coil springs to provide a novel core, which operates to maintain the casing in a proper expanded state, and to absorb the shocks to which it is subjected in travel. The method of assembly, the method of installation, and the manner of operation is doubtless clear to persons skilled in the art to which the invention appertains. Therefore, a more lengthly description is believed to be unnecessary.

Minor changes coming within the field of invention claimed may be resorted to, if desired.

I claim:

1. A tire comprising a rim having side flanges, a casing having its bead portions confined between said flanges, a resilient core disposed within said casing, said core being provided with a series of longitudinally bowed leaf springs having laterally directed extremities engaging the bead portions of the casing, said springs being disposed in close spaced relation about the circumference of the casing and having eyes struck inwardly from the intermediate portions of the arms thereof, and tie wires extending through said eyes for maintaining said springs in assembled relation.

2. A tire comprising a rim having side flanges, a casing having its bead portions confined between said flanges, a resilient core disposed within said casing, said core comprising a series of longitudinally bowed leaf springs having laterally directed extremities engaging the bead portions of the casing, said springs being disposed in close spaced relation about the circumference of the casing and having eyes struck inwardly from the intermediate portions of the arms thereof, tie wires extending through said eyes for maintaining said springs in assembled relation, coil springs connected at their opposite ends to the intermediate portions of the arms of the leaf springs, and a wear strip interposed between the tread portion of the casing and the crown portions of said leaf springs.

In testimony whereof, I affix my signature.

LEON LAMBERT.